United States Patent
Polidora et al.

(10) Patent No.: US 11,996,205 B2
(45) Date of Patent: May 28, 2024

(54) METHOD AND APPARATUS FOR INSPECTING A FUEL ASSEMBLY

(71) Applicant: Westinghouse Electric Company LLC, Cranberry Township, PA (US)

(72) Inventors: James T. Polidora, North Huntingdon, PA (US); Shawn D. Lazeski, Latrobe, PA (US); Jeff H. Sleasman, Somerset, PA (US)

(*) Notice: Subject to any disclaimer, the term of this patent is extended or adjusted under 35 U.S.C. 154(b) by 433 days.

(21) Appl. No.: 17/316,485

(22) Filed: May 10, 2021

(65) Prior Publication Data
US 2021/0335512 A1 Oct. 28, 2021

Related U.S. Application Data

(62) Division of application No. 15/854,268, filed on Dec. 26, 2017, now Pat. No. 11,031,144.

(51) Int. Cl.
| | |
|---|---|
| *G21C 17/06* | (2006.01) |
| *G01L 19/08* | (2006.01) |
| *G21C 19/10* | (2006.01) |
| *H04N 5/77* | (2006.01) |
| *G21C 19/07* | (2006.01) |
| *G21C 19/20* | (2006.01) |
| *H04N 23/50* | (2023.01) |

(52) U.S. Cl.
CPC .......... *G21C 17/06* (2013.01); *G01L 19/086* (2013.01); *G21C 19/10* (2013.01); *H04N 5/77* (2013.01); *G21C 19/07* (2013.01); *G21C 19/207* (2013.01); *H04N 23/555* (2023.01)

(58) Field of Classification Search
CPC ......... G21C 17/06; G21C 19/07; G21C 19/10
See application file for complete search history.

(56) References Cited

U.S. PATENT DOCUMENTS

| | | | | |
|---|---|---|---|---|
| 3,430,044 A | * | 2/1969 | Briffaud ................. | G21C 17/08 378/58 |
| 4,605,531 A | * | 8/1986 | Leseur ................... | G21C 17/06 376/251 |

(Continued)

FOREIGN PATENT DOCUMENTS

| | | |
|---|---|---|
| CN | 105047239 A | 11/2015 |
| CN | 105118535 A | 12/2015 |

(Continued)

OTHER PUBLICATIONS

Westinghouse, "SureTrac Fuel Pool Index System" NS-FS-0054, Apr. 2009; available at https://www.westinghousenuclear.com/Portals/0/operating%20plant%20services/outage%20services/refueling%20services/NS-FS-0054%20Surtrac%20Fuel%20Pool.pdf. (Year: 2009).*

(Continued)

*Primary Examiner* — Sharon M Davis

(57) ABSTRACT

A fuel assembly inspection system that utilizes a pressure transducer mounted to a utility's spent fuel handling tool to detect a relative change in depth of a fuel assembly during fuel inspections. The system then wirelessly transmits the signal to a fuel inspection recording system, which converts the signal to a relative height along the fuel assembly being viewed by a camera, and displays the relative height along with the applicable fuel assembly feature being viewed by the camera (e.g., nozzle, grid, span) via a text overlay on the video image of the inspection.

10 Claims, 2 Drawing Sheets

(56) References Cited

U.S. PATENT DOCUMENTS

| | | |
|---|---|---|
| 5,912,934 A | 6/1999 | Acks et al. |
| 2004/0032924 A1 | 2/2004 | Judge, Jr. |
| 2009/0225925 A1 | 9/2009 | Eisner et al. |
| 2010/0303189 A1 | 12/2010 | Cauvin et al. |
| 2011/0182393 A1* | 7/2011 | Hequet .................. G01B 11/16 376/248 |
| 2012/0222489 A1* | 9/2012 | Hummel .................. G01B 5/25 73/779 |
| 2016/0012925 A1* | 1/2016 | Ahlberg ................ G21D 3/001 376/258 |
| 2019/0198184 A1 | 6/2019 | Polidora et al. |
| 2020/0203031 A1* | 6/2020 | Villa ........................ B25J 19/02 |

FOREIGN PATENT DOCUMENTS

| | | | |
|---|---|---|---|
| CN | 106098124 A | 11/2016 | |
| CN | 107063101 A | 8/2017 | |
| KR | 0128822 B1 | 11/1997 | |
| WO | WO-9714154 A1 * | 4/1997 | ............ G21C 17/06 |
| WO | 2007111554 A1 | 10/2007 | |
| WO | 2008054462 A2 | 5/2008 | |
| WO | 2017037384 A1 | 3/2017 | |
| WO | 2019133107 A1 | 7/2019 | |

OTHER PUBLICATIONS

International Search Report and Written Opinion for International PCT Application No. PCT/US2018/059140, dated Feb. 25, 2019.
International Preliminary Report on Patentability for International PCT Application No. PCT/US2018/059140, dated Jun. 30, 2020.
Supplementary European Search Report for corresponding European Patent Application No. EP18893617.3, dated Jul. 20, 2021.

* cited by examiner

METHOD AND APPARATUS FOR INSPECTING A FUEL ASSEMBLY

CROSS-REFERENCE TO RELATED APPLICATIONS

This application is a divisional application claiming priority under 35 U.S.C. § 120 to U.S. patent application Ser. No. 15/854,268, entitled METHOD AND APPARATUS FOR INSPECTING A FUEL ASSEMBLY, the entire disclosure of which is hereby incorporated by reference herein.

BACKGROUND

1. Field

This invention relates in general to a method and apparatus for inspecting nuclear fuel assemblies and, more particularly, to a method and apparatus for inspecting nuclear fuel assemblies remotely, underwater.

2. Related Art

In the nuclear power industry there are a number of reasons a nuclear fuel assembly may need to be inspected after insertion into a reactor while resident in a spent fuel pool. The fuel assemblies may need to be inspected for damage in loading or unloading, for leaking fuel rods, crud or corrosion or a number of other reasons. The task can be cumbersome, because most fuel handling cranes do not have position readouts. The fuel movement operator must use marks on the crane and count fuel assembly locations under water by looking down. After numerous fuel moves there is the possibility of an error occurring, i.e., the wrong fuel assembly being moved or a fuel assembly being inserted into the wrong location. Nevertheless, it is imperative that all fuel assemblies be placed in their assigned locations at all times so that 100% fuel accountability is maintained. To overcome this difficulty and assure the correct fuel assembly assigned location is being addressed a position readout system for the fuel handling cranes was developed, known as the SureTrac system. The SureTrac system is an entirely portable system and accomplishes this by means of two wireless laser-tracking devices and a wireless pressure sensor that are temporarily mounted on the fuel-handling machine. The tracking devices send X, Y, Z position information to a laptop computer that processes it.

The SureTrac computer software has a virtual spent fuel pool that represents the actual spent fuel pool. When the fuel handling crane is over a fuel rack in the spent fuel pool, the SureTrac software automatically zooms-in on the rack and displays the actual cell location. The fuel cell alphanumeric position is sent to an electronic display with a wireless link. A position-only mode displays the current fuel cell location on the electronic display. When a Z elevation sensor is included, the offload, insert shuffle and reload modes have the crane moves stored in a database. If the operator begins to deviate from the programmed sequence, an audible alarm sounds to warn of an error.

For servicing the spent fuel pool, the SureTrac system is set up on the fuel handling crane in the Fuel Building at a nuclear power plant to track the position of the crane hook. There are racks of fuel assemblies in the spent fuel pool located about 20 feet under water. The SureTrac system provides a readout of the rack cell location that the fuel handling crane is currently over. The Crane Bridge and Trolley (X, Y) information is obtained by distance lasers with wireless data links which transmit the information to a laptop computer. The computer processes the information then transmits the alphanumeric position wirelessly to the electronic display. The electronic display provides feedback to the fuel handling personnel.

The SureTrac system provides a big improvement in correctly locating a fuel assembly to be inspected, but it is not equipped to aid an inspector in performing the inspection. A further improvement is desired that will assist an inspector in understanding what the inspector is actually viewing and make a record of that view.

SUMMARY

This invention achieves the foregoing objective by providing a method and apparatus for remotely inspecting a nuclear fuel assembly stored in a cell within a rack in the lower portion of a spent fuel pool. The method supports a camera within the spent fuel pool above the rack, focused above the cell in which the nuclear fuel assembly is stored. The camera has an output which is transmitted to a processing apparatus outside of the spent fuel pool. A pressure transducer is fitted to a long handled fuel assembly handling tool, at a fixed distance above a connector on the fuel assembly handling tool that attaches to the fuel assembly and below a point on the fuel assembly handling tool that will remain submerged within the spent fuel pool when the fuel assembly handling tool raises the fuel assembly substantially, completely out of the rack. The pressure transducer has an output representative of the depth within the spent fuel pool at the pressure transducer elevation, which pressure transducer output is transmitted to the processing apparatus. The method lowers the connector to the fuel assembly and attaches the connector to the fuel assembly. The method then raises the fuel assembly out of the cell with the fuel assembly handling tool, as the camera records a portion of the fuel assembly in view of the camera, as at least part of the camera output, which is communicated to the processing apparatus. The processing apparatus then correlates the pressure transducer output to an elevation of the image on the fuel assembly viewed by the camera and displays a representation of the fuel assembly at a location remote from the spent fuel pool, with the image superimposed on the representation at the elevation.

Preferably, the raising step raises the fuel assembly in incremental steps with each step having a height approximately equal to the height of the image. In one embodiment, wherein the fuel assembly has a plurality of sides, after each raising step increment the fuel assembly handling tool pauses the raising of the fuel assembly and rotates the fuel assembly so the camera captures an image of each of the sides. Alternately, a separate camera is provided for each of the sides. Desirably, the camera output and the pressure transducer output are transmitted to the processing apparatus wirelessly. In one such embodiment, the camera is supported from the rack and, preferably, the camera output fed to the display is recorded. The method may also include the step of generating labels of at least some of the features of the representation of the fuel assembly and attaching those labels to the corresponding features on the display of the representation.

The invention also contemplates apparatus for remotely inspecting a nuclear fuel assembly stored in a cell within a rack in a lower portion of a spent fuel pool. The apparatus includes a camera that is configured to be supported within the spent fuel pool above the rack and focused above the cell in which the nuclear fuel assembly to be inspected is stored.

The camera has an output representative of an image in view of the camera, which is transmitted to a location outside the spent fuel pool. The apparatus also includes a fuel assembly handling tool that is configured to move fuel assemblies into and out of respective cells within the rack from above the spent fuel pool and moves the fuel assemblies vertically relative to the camera, so the camera vertically scans the fuel assemblies. The fuel assembly handling tool has a connector at its lower end that is structured to attach to the fuel assembly. A pressure transducer is attached to the fuel assembly handling tool at a known distance above the connector and below a point on the fuel assembly handling tool that will remain submerged within the spent fuel pool when the fuel assembly handling tool raises the fuel assembly substantially, completely out of the rack. The pressure transducer is configured to have an output representative of the depth within the spent fuel pool at the pressure transducer elevation, which pressure transducer output is transmitted to the location outside of the spent fuel pool. A processing apparatus is provided at the location outside of the spent fuel pool. The processing apparatus is configured to receive the camera output and pressure transducer output, correlate the pressure transducer output to an elevation of the image on the fuel assembly and display a representation of the fuel assembly, at the location outside of the spent fuel pool, with the image superimposed on the representation at the elevation.

In one embodiment wherein the fuel assembly has a plurality of sides, the camera comprises a plurality of cameras at least one camera focused on each side of the fuel assembly. Preferably, a wireless transmitter is provided that is configured to transmit the camera output and the pressure transducer output to the location outside the spent fuel pool. The apparatus may also include a recorder operable to record the display of the representation of the fuel assembly to document the inspection. In still another embodiment the apparatus includes a character generator operable to generate labels of at least some of the features of the representation of the fuel assembly and attach those labels to the corresponding features on the display of the representation of the fuel assembly.

The invention also contemplates a method of remotely, vertically scanning an object immersed in a liquid. The method includes the step of positioning a sensor within the liquid in view of a portion of the object to be scanned, with the sensor having an output of an image of the portion of the object at a given elevation on the object that is transmitted to a remote location. The method attaches a pressure transducer to one of the object or the sensor at a known elevation from the portion of the object to be scanned. The pressure transducer has an output representative of the pressure at an elevation in the liquid of the pressure transducer that is transmitted to the remote location. The method vertically moves one of the object or the sensor so the sensor vertically scans the object and correlates the pressure transducer output to the given elevation of the image on the object. A representation of the object is displayed at the remote location with the image superimposed on the representation at the given elevation. Preferably, the pressure transducer output and the sensor output are transmitted wirelessly.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

While performing fuel assembly visual inspections, it is important for the inspector to track and understand the portion of the fuel assembly the inspector is viewing at all times. Currently, the inspector must manually track this information and input this information on the video recording. This tracking and inputting step can distract the inspector from his main objective of examining the fuel assembly for defects. A system is desired that automatically tracks and displays the fuel assembly location in view in relation to the inspection camera. Such a system will improve visual inspections by allowing the inspector to focus only on the integrity of the fuel assembly components and will increase the accuracy of the recorded video image.

This invention employs a pressure transducer mounted on a fuel handling tool that is currently employed to track the depth of a fuel assembly in the spent fuel pool during fuel cleaning and fuel movement through the Suretrac system, to determine the relative portion on the fuel assembly being viewed by an inspection camera. The invention converts the pressure transducer signal into an indication of the elevation on the fuel assembly in view of the camera, then cross references that information to a fuel design to display and record both the elevation being viewed by the inspection camera and the applicable fuel assembly feature being viewed and displayed on the video recording device. The system increases the quality and accuracy of fuel assembly visual inspections by automating the tracking of a display of the fuel assembly portion being scanned. This frees up the fuel inspector to be better able to provide undivided focus and attention into looking for fuel anomalies. This system will also provide an increase in the quality of the video records that will be available following a fuel inspection campaign.

Figure 1:
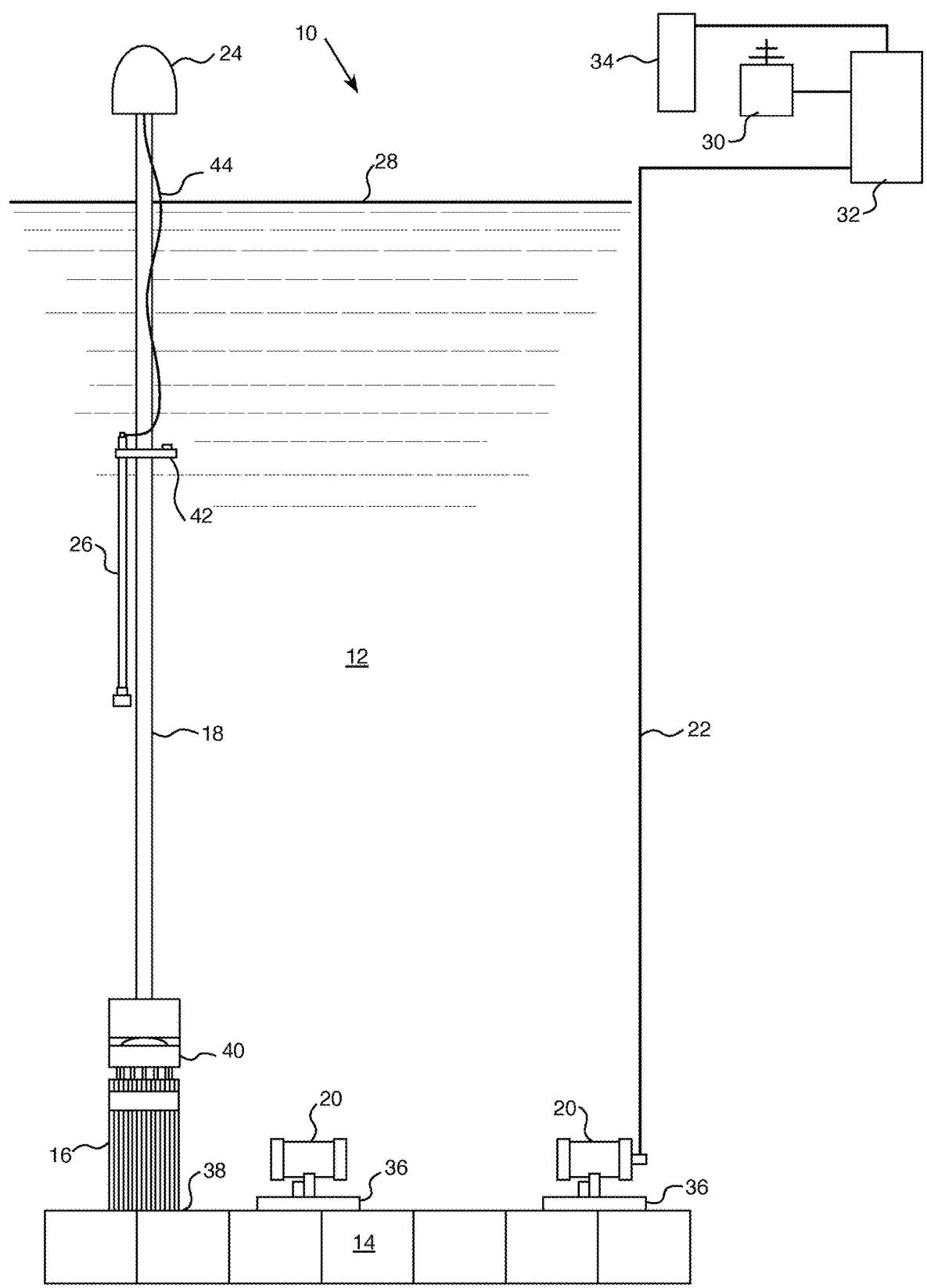
FIG. 1 is a schematic view of the apparatus of this invention deployed for an inspection of a spent nuclear fuel assembly in a spent fuel pool.
Figure 2:
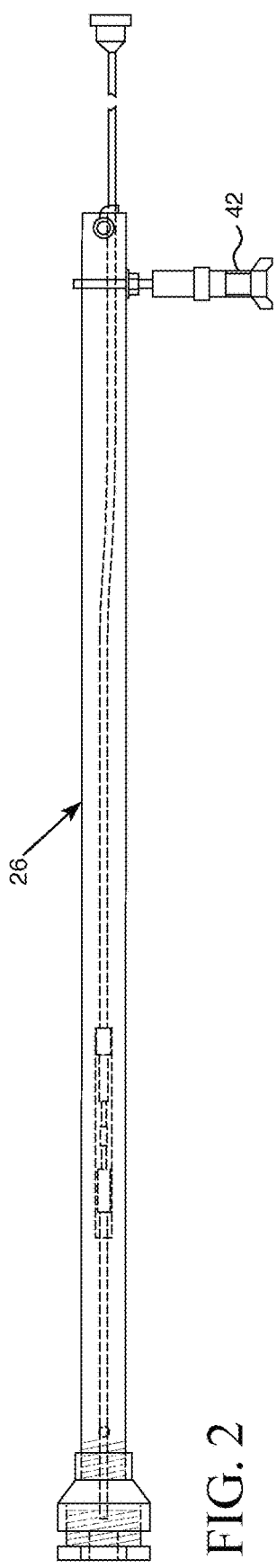
FIG. 2 is a side view of the pressure sensor assembly shown in FIG. 1.
Figure 3:
FIG. 3 is a side view of the internal components of the pressure sensor assembly shown in FIG. 2 in dotted form.
Figure 4:
FIG. 4 is a side angled view of the outer casing of the pressure sensor assembly shown in FIG. 2.
Figure 5:
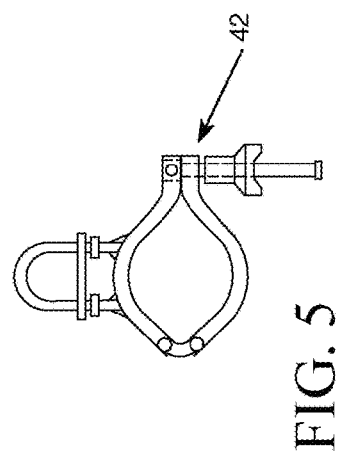
FIG. 5 is plan view of the bracket used to mount the pressure transducer assembly to the cladding shown in FIG. 2.

FIG. 1 shows a schematic diagram of the inspection system 10 in accordance with one embodiment of this invention, deployed in and about a spent fuel pool 12. The fuel assemblies are stored in cells in the spent fuel racks 14 in a lower portion of the spent fuel pool 12 under twenty to thirty feet of water, indicated by the water level 28. One or more video cameras 20 are supported on the rack 14, focused above the cell 38 housing the fuel assembly 16 to be inspected. At least one camera 20 is preferably provided for each side of the fuel assembly to view each of the sides. A fuel handling tool 18 is lowered onto the top nozzle 40 of the fuel assembly 16 and attached to the top nozzle. The spent fuel handling tool 18 is then raised vertically, preferably in increments not larger than the image viewed by the cameras 20 until the entire height of the fuel assembly is observed. Alternately, the camera 20 can ride on a motorized plate 36 that extends around more than one side to scan multiple sides of the fuel assembly.

A pressure transducer 26 is supported from a bracket 42 on the spent fuel handling tool 18, a known distance above the fuel assembly 16 below the water line 28, a distance that keeps the pressure sensor in the pressure transducer submerged when the fuel assembly is lifted entirely out of the rack 14. The pressure transducer signal 44 is fed to a wireless transmitter 24 which communicates the signal to a wireless receiver 30 at a remote location. The received signal is then communicated to a processor 32 at the remote location, that from the known dimensions of the fuel assembly 16, the relative height of the pressure transducer 26 above the fuel assembly 16 and the pressure transducer signal 44 converts the pressure transducer signal to a value that identifies the elevation along the fuel assembly being viewed by the video image from the camera 20 and overlays that video image on a representation of the fuel assembly generated by the processor 32 on a display 34. The relative height of the pressure transducer above the fuel assembly may be compensated for by zeroing out the pressure transducer signal as the top of the fuel assembly comes into view of the camera. A character generator within the processor 32 generates labels which can be imposed on the representation of the fuel assembly to identify the features of the fuel assembly being viewed by the inspector.

FIGS. 2-5 provide a more detailed view of the pressure sensor assembly 26 and its various components.

While specific embodiments of the invention have been described in detail, it will be appreciated by those skilled in the art that various modifications and alternatives to those details could be developed in light of the overall teachings of the disclosure. For example, a similar result can be achieved by raising the fuel assembly completely out of the fuel rack cell and moving the camera vertically over the fuel assembly with the pressure transducer attached to the camera. In such a case the fuel assembly can be rotated to scan the entire circumference of the fuel assembly at each vertical increment of movement of the camera. Furthermore, it should be appreciated that the scope of this invention would not be obviated if the steps of this method was performed in a slightly different order or way, for example by zeroing out the pressure transducer when the camera is in view of the bottom of the fuel assembly to compensate for the height of the pressure transducer above the fuel assembly or placing the pressure transducer directly above the fuel assembly. Accordingly, the particular embodiments disclosed are meant to be illustrative only and not limiting as to the scope of the invention which is to be given the full breadth of the appended claims and any and all equivalents thereof.

What is claimed is:

1. A method of remotely inspecting a nuclear fuel assembly stored in a cell within a rack in a lower portion of a spent fuel pool, the method comprising the steps of:
   supporting a camera within the spent fuel pool above the rack focused above the cell in which the nuclear fuel assembly is stored, the camera having an output;
   fastening a pressure transducer to a fuel assembly handling tool at a fixed distance above a connector on the fuel assembly handling tool that attaches to the fuel assembly and below a point on the fuel assembly handling tool that will remain submerged within the spent fuel pool when the fuel assembly handling tool raises the fuel assembly substantially completely out of the rack, the pressure transducer having an output representative of the depth within the spent fuel pool at the pressure transducer elevation;
   lowering the connector to the fuel assembly;
   attaching the connector to the fuel assembly;
   raising the fuel assembly out of the cell with the fuel assembly handling tool as the camera records a portion of the fuel assembly in view of the camera;
   transmitting the camera output to a processing apparatus, the camera output including an image of the portion of the fuel assembly in view;
   transmitting the pressure transducer output to the processing apparatus;
   correlating, in the processing apparatus, the pressure transducer output to an elevation of the image on the fuel assembly; and
   displaying a representation of the fuel assembly at a location remote from the spent fuel pool, with the image superimposed on the representation at the elevation.

2. The method of claim 1 wherein the raising step raises the fuel assembly in incremental steps with each step having a height approximately equal to the height of the image.

3. The method of claim 2 wherein the fuel assembly has a plurality of sides and after each raising step increment the fuel assembly handling tool pauses the raising of the fuel assembly and rotates the fuel assembly so the camera captures an image of each of the sides.

4. The method of claim 3 wherein a separate camera is provided for each of the sides.

5. The method of claim 1 wherein the pressure transducer output is transmitted to the processing apparatus wirelessly.

6. The method of claim 1 further including a step of recording the representation of the fuel assembly.

7. The method of claim 1 wherein the step of supporting the camera involves supporting the camera from the rack.

8. The method of claim 1 further including a step of generating labels of at least some of the features of the fuel assembly and attaching those labels to corresponding features of the representation of the fuel assembly.

9. The method of claim 1 wherein the correlating step zeros-out the output of the pressure transducer when the camera is in view of a component of the fuel assembly that has a known elevation along the fuel assembly to compensate for a height of the pressure transducer above the fuel assembly.

10. The method of claim 9 wherein the component of the fuel assembly is one of a top nozzle or a bottom nozzle.

* * * * *